United States Patent
Cahill et al.

(10) Patent No.: US 10,934,758 B2
(45) Date of Patent: Mar. 2, 2021

(54) DESENSITIZED ADJUSTABLE BUMPER

(71) Applicant: GM Global Technology Operations LLC, Detroit, MI (US)

(72) Inventors: Ryan Cahill, Royal Oak, MI (US); Kyle C. Smith, Hazel Park, MI (US); Robert J. Hood, Clinton Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 108 days.

(21) Appl. No.: 16/142,763

(22) Filed: Sep. 26, 2018

(65) Prior Publication Data
US 2020/0095817 A1 Mar. 26, 2020

(51) Int. Cl.
| | | |
|---|---|---|
| *E05F 5/02* | (2006.01) | |
| *B62D 25/12* | (2006.01) | |
| *B62D 65/02* | (2006.01) | |

(52) U.S. Cl.
CPC .............. *E05F 5/022* (2013.01); *B62D 25/12* (2013.01); *B62D 65/02* (2013.01); *E05Y 2900/536* (2013.01); *E05Y 2900/548* (2013.01)

(58) Field of Classification Search
CPC ......... E05F 5/022; B62D 25/12; B62D 65/02; E05Y 2900/536; E05Y 2900/548
See application file for complete search history.

(56) References Cited

U.S. PATENT DOCUMENTS 5,735,511 A * 4/1998 Stocker ................... E05F 5/022
248/569

* cited by examiner

*Primary Examiner* — D Glenn Dayoan
*Assistant Examiner* — Melissa Ann Bonifazi

(57) ABSTRACT

An adjustable bumper assembly includes a bumper assembly insert having a bumper head, a threaded portion connected to the bumper head and a ratchet portion extending from the threaded portion. A coupling ring is threadably connected to the threaded portion. The coupling ring has a ratchet device with a tooth biased into contact with the ratchet portion. A base member includes multiple retention arms homogeneously connected to the base member extending away from a face of the base member. The coupling ring when slidably received in a through passage created in the face of the base member contacts the retention arms. The coupling ring is non-rotatably engaged to the base member such that axial rotation of the bumper assembly insert with respect to the coupling ring axially extends or retracts the bumper assembly insert with respect to the base member.

18 Claims, 6 Drawing Sheets

DESENSITIZED ADJUSTABLE BUMPER

INTRODUCTION

The present disclosure relates to bumpers used to adjust vehicle panel positions during vehicle construction.

Bumper units are known which are commonly connected to vehicle structure such as the floor or walls of a trunk space or a rear storage area of a sport utility vehicle. The bumper units provide axial extending and retracting members that permit subsequent alignment of panel and trunk lids with other vehicle panels. After installation of the bumper units a trim member such as a carpet member or a polymeric cover is commonly positioned onto the floor or wall. Because the bumper units are already in position, apertures which are pre-formed in the trim member must be aligned with each of the bumper units to permit bumper unit functioning. Due to construction tolerances, the apertures in the trim member are commonly larger than required due to the size of the bumper units, but do not always align closely with the bumper units, thereby creating aesthetic issues with the finished installation. Multiple minor movements of the trim member are commonly required to optimize the apertures of the trim member with the as-installed positions of the bumper units to minimize a gap between a wall of the trim member apertures and each of the bumper units.

Thus, while current vehicle bumper units achieve their intended purpose, there is a need for a new and improved system and method for assembling and installing bumper units in vehicles.

SUMMARY

According to several aspects, an adjustable bumper assembly includes a first part defining a bumper assembly insert. The bumper assembly insert has a bumper displaceably connected to a coupling ring. The second part defines a base member. The base member has multiple retention arms connected to the base member extending away from a face of the base member each having a hook-end. The coupling ring when slidably received in a through passage of the base member contacts the hook-end of the retention arms. The coupling ring is non-rotatably engaged to the base member such that axial rotation of the bumper axially extends or retracts the bumper with respect to the base member.

In another aspect of the present disclosure, the bumper includes a bumper head and a threaded portion extending from the bumper head threadably receiving the coupling ring to displaceably connect the bumper to the coupling ring.

In another aspect of the present disclosure, the bumper includes a ratchet portion extending from the threaded portion having multiple splines interspaced by multiple valleys.

In another aspect of the present disclosure, the coupling ring includes a ratchet device having a tooth releasably positioned in one of the multiple valleys or outwardly deflected by one of the splines as the bumper axially rotates with respect to the base member, the tooth when positioned in one of the multiple valleys acting as a releasable stop against axial rotation of the bumper.

In another aspect of the present disclosure, the ratchet device is homogeneously connected to the coupling ring by a first connection neck that allows elastic deflection of the ratchet device defining a ratcheting motion of the ratchet device.

In another aspect of the present disclosure, the coupling ring includes at least one axial slot located on an outer surface of the coupling ring.

In another aspect of the present disclosure, the base member includes at least one key extending partially into the through passage of the base member.

In another aspect of the present disclosure, the at least one key is received in the at least one axial slot allowing the coupling ring to slidably displace toward the hook-end of the retention arms but preventing axial rotation of the coupling ring with respect to the base member.

In another aspect of the present disclosure, the hook-end of the retention arms defines an axial stop for the coupling ring.

In another aspect of the present disclosure, the coupling ring includes a male extending member outwardly extending away from an outer surface of the coupling ring. The multiple retention arms each have a slot, wherein one of the slots of one of the retention arms when receiving the male extending member fixes the coupling ring to the base member.

According to several aspects, an adjustable bumper assembly includes a bumper assembly insert having a bumper head, a threaded portion connected to the bumper head and a ratchet portion extending from the threaded portion. A coupling ring is threadably connected to the threaded portion. The coupling ring has a ratchet device with a tooth biased into contact with the ratchet portion. A base member includes multiple retention arms homogeneously connected to the base member extending away from a face of the base member. The coupling ring when slidably received in a through passage created in the face of the base member contacts the retention arms. The coupling ring is non-rotatably engaged to the base member such that axial rotation of the bumper assembly insert with respect to the coupling ring axially extends or retracts the bumper assembly insert with respect to the base member.

In another aspect of the present disclosure, the ratchet portion includes multiple splines interspaced by multiple valleys, the tooth of the ratchet device ratcheting over successive ones of the splines and into successive ones of the multiple valleys during axial rotation of the bumper assembly insert, the tooth when positioned in one of the multiple valleys acting as a releasable stop resisting axial rotation of the bumper.

In another aspect of the present disclosure, the ratchet device is homogeneously connected to the coupling ring by a connection neck that allows elastic deflection of the ratchet device defining a ratcheting motion of the ratchet device during axial rotation of the bumper assembly insert.

In another aspect of the present disclosure, the multiple retention arms each have a hook-end, the coupling ring contacting the hook-end of the retention arms defining an installed position of the coupling ring.

In another aspect of the present disclosure, the coupling ring includes a male extending member outwardly extending away from an outer surface of the coupling ring. The multiple retention arms each have a slot, wherein one of the slots of one of the retention arms when receiving the male extending member prevents axial rotation of the coupling ring defining an installed position of the coupling ring.

In another aspect of the present disclosure, the coupling ring includes an axial slot located on an outer surface of the coupling ring. The base member includes a key extending partially into the through passage of the base member, the key when received in the axial slot preventing axial rotation of the coupling ring.

In another aspect of the present disclosure, the multiple retention arms each have a hook-end. The contact ring when contacting the hook-end of the retention arms defines an installed position of the coupling ring. The key when received in the axial slot allows the coupling ring to slidably displace toward the hook-end of the retention arms.

According to several aspects, a method for installing a bumper assembly into a vehicle. The bumper assembly includes a bumper head, a threaded portion connected to the bumper head and a ratchet portion extending from the threaded portion. The method comprises: connecting a base member having multiple retention arms homogeneously connected to the base member to a vehicle panel; covering the base member and the vehicle panel with a trim member having an aperture located at the base member; threadably connecting a coupling ring to the threaded portion; slidably extending the bumper assembly through the aperture of the trim member and into a through passage in a face of the base member until the bumper assembly contacts the retention arms; and non-rotatably engaging the coupling ring to the base member such that axial rotation of the bumper assembly with respect to the coupling ring axially extends or retracts the bumper assembly with respect to the base member.

In another aspect of the present disclosure, the method further includes biasing a tooth of a ratchet device extending from the coupling ring into contact with one of multiple successive valleys of the ratchet portion such that engagement of the tooth into any one of the valleys acts as a releasable stop resisting the axial rotation of the bumper assembly.

In another aspect of the present disclosure, the non-rotatably engaging step includes: creating an axial slot on an outer surface of the coupling ring; and aligning a key extending partially into the through passage of the base member into the axial slot to prevent axial rotation of the coupling ring during the axial rotation of the bumper assembly.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
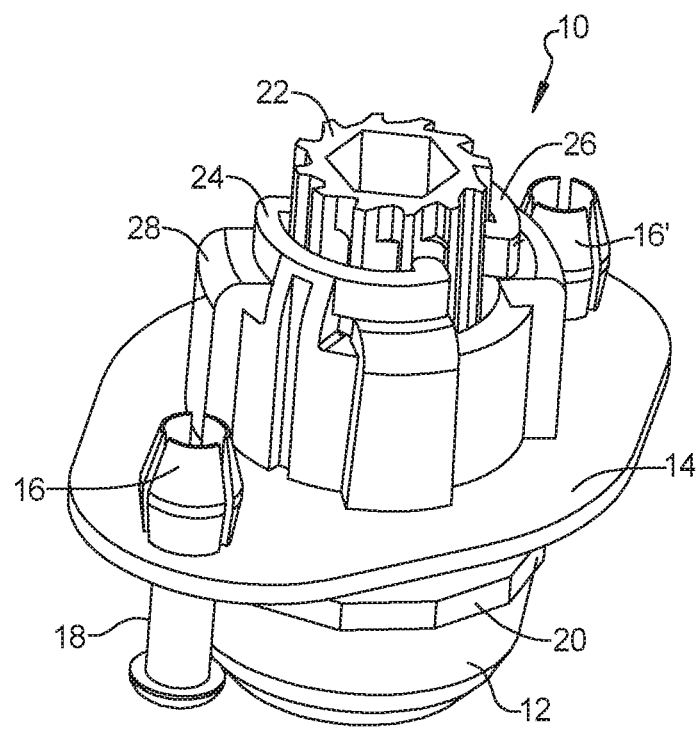
FIG. 1 is a bottom perspective view of an adjustable bumper assembly according to an exemplary embodiment.

Referring to FIG. 1, an adjustable bumper assembly 10 of the present disclosure includes first part defining a bumper 12 threadably engaged and displaceable with respect to a second part defining a base member 14. The base member 14 homogeneously includes at least one and according to several aspects a first fastener retention member 16 and a second fastener retention member 16'. Each of the first fastener retention member 16 and the second fastener retention member 16' receive a fastener 18 to engage the base member 14 to a vehicle deck portion shown and described in greater detail in reference to FIG. 11.

Figure 4:
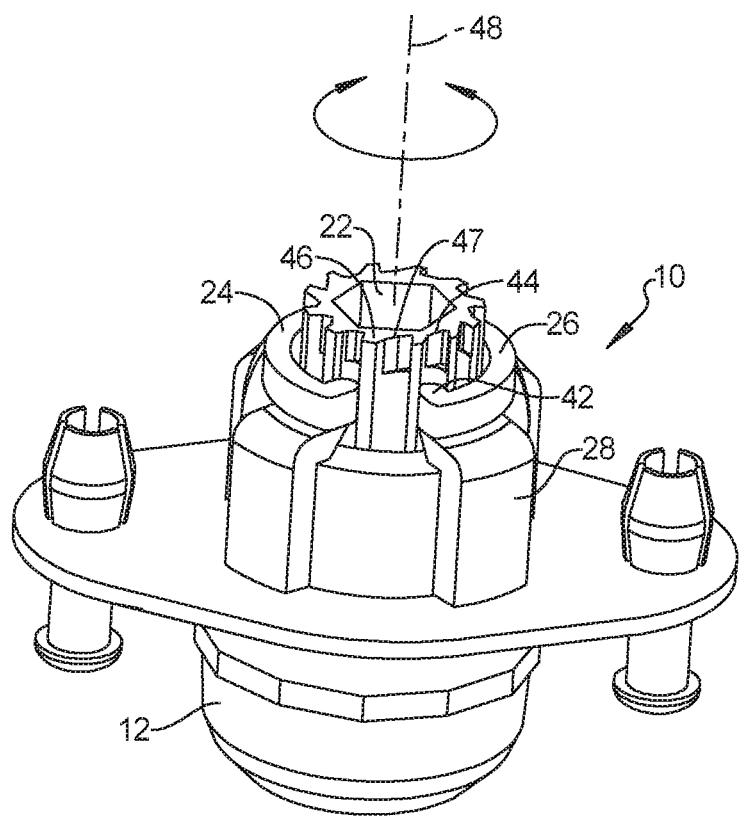
FIG. 4 is a bottom elevational perspective view of the adjustable bumper assembly of FIG. 1.

The bumper 12 includes a multiple facet engagement ring 20 homogeneously provided with the bumper 12 to allow manual contact and axial rotation of the bumper 12 with respect to the base member 14. A ratchet portion 22 is also homogeneously connected to the bumper 12 having splines and valleys described in greater detail in reference to FIG. 4 which are releasably engaged by at least a first ratchet device 24 and according to several aspects an oppositely facing second ratchet device 26, each homogeneously connected to the base member 14. Multiple retention arms such as a first retention arm 28 are also each homogeneously provided with the base member 14, each two of which support and allow rotational movement of the first ratchet device 24 or the second ratchet device 26.

Referring to FIG. 2 and again to FIG. 1, the engagement ring 20 of the bumper 12 includes multiple faces or facets 30 about a perimeter of the engagement ring 20. The facets 30 promote frictional contact for example by the hand of an installer (not shown) of the bumper 12 allowing the installer to axially rotate the bumper 12. The bumper 12 also includes a curved bumper head 31 at a free end of the bumper 12. According to several aspects, the bumper 12 can also include a fastener nut 32 created in the bumper head 31 which can be engaged by a tool such as a wrench (not shown) to promote axial rotation of the bumper 12.

Figure 2:
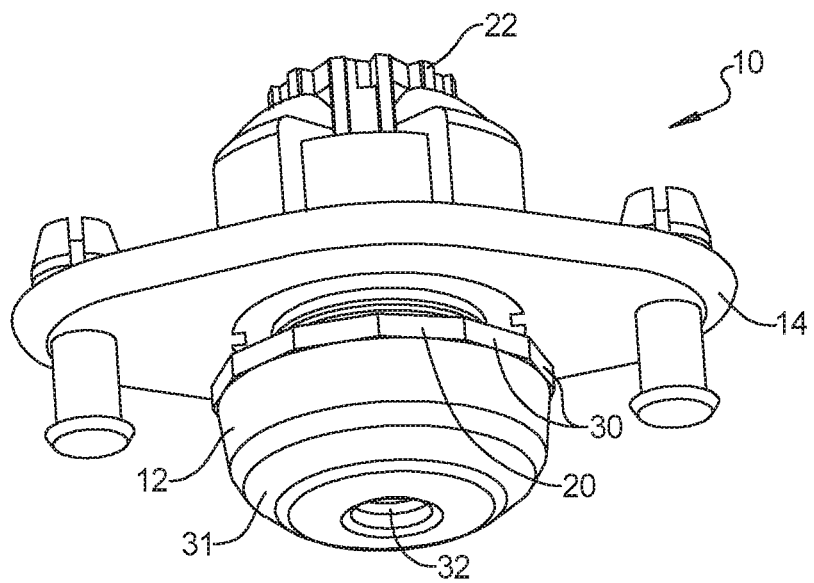
FIG. 2 is a side perspective view of the adjustable bumper assembly of FIG. 1.

Referring to FIG. 3 and again to FIGS. 1 through 2, a threaded portion 34 is also homogeneously provided with the bumper 12. The threaded portion 34 is positioned between the bumper 12 and the ratchet portion 22. A continuous thread of the threaded portion 34 threadably couples the bumper 12 into a coupling ring 36. The coupling ring 36 is slidably received between the retention arms such as the first retention arm 28. According to several aspects, the retention arms also act as a stop feature for the coupling ring 36 as will be described in greater detail in reference to FIGS. 8, 9 and 10. The threaded portion 34 permits a spacing 38 between the engagement ring 20 of the bumper 12 and a first face 40 of the base member 14 to be modified by axially rotating the bumper 12 while the coupling ring 36 is non-rotationally held by the retention arms such as the first retention arm 28 and by male keys extending from the base member 14 which are shown and described in greater detail in reference to FIGS. 8 and 9.

Figure 3:
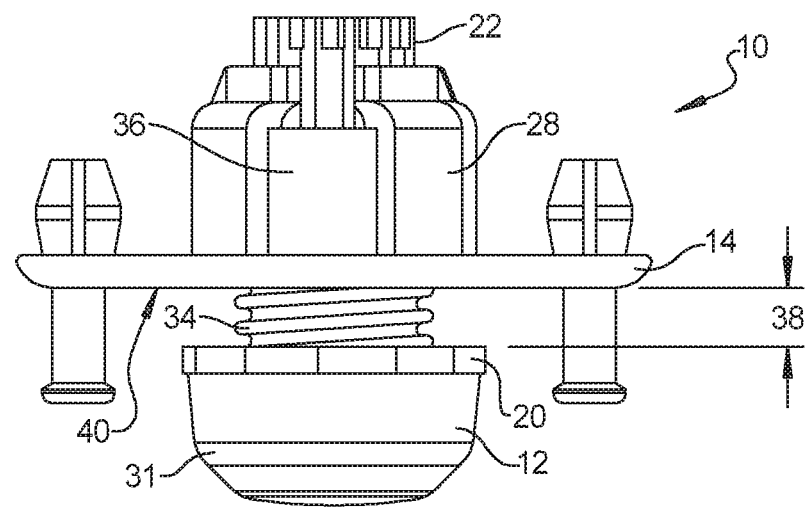
FIG. 3 is a side elevational view of the adjustable bumper assembly of FIG. 1.

Referring to FIG. 4 and again to FIGS. 1 through 3, each of the first ratchet device 24 and the second ratchet device 26 include ratchet teeth, such as for example a first ratchet tooth 42 directed toward the ratchet portion 22. The ratchet portion 22 includes multiple outwardly directed raised ridges or splines, such as a first spline 44 and a second spline 46 axially extending along the ratchet portion 22. Each successive pair of the splines has a valley such as an exemplary valley 47 positioned between the successive splines. The teeth of each of the first ratchet device 24 and the second ratchet device 26 such as the first ratchet tooth 42 outwardly deflect during contact with any one of the splines as the ratchet portion 22 axially rotates about an axis of rotation 48, by elastic deformation of each of the first ratchet device 24 and the second ratchet device 26. The teeth then displace by elastic return force into one of the valleys such as into the valley 47. Frictional contact of each of the teeth of the first ratchet device 24 and the second ratchet device 26 within one of the valleys of the ratchet portion 22 releasably resists axial rotation of the ratchet portion 22 and thereby the bumper 12 unless an axial force is applied to the bumper 12 which elastically deflects the teeth out of the valleys. The spacing 38 between the engagement ring 20 of the bumper 12 and the first face 40 of the base member 14 described in reference to FIG. 3 is therefore releasably retained after initial positioning of the bumper 12 during manufacture or by the installer.

Figure 5:
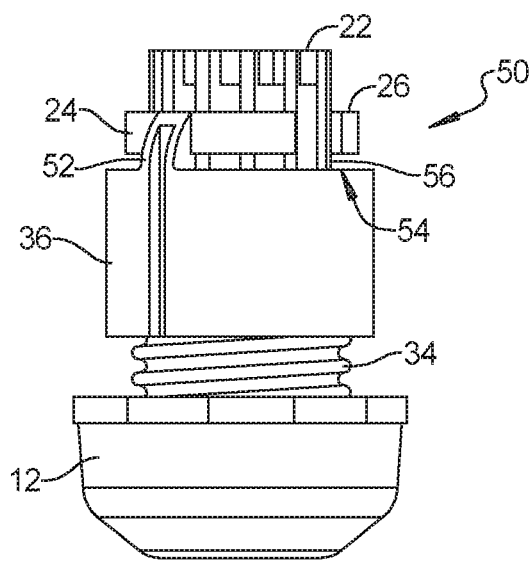
FIG. 5 is a side elevational view of a bumper assembly insert of the adjustable bumper assembly of FIG. 1.

Referring to FIG. 5 and again to FIG. 1, a bumper assembly insert 50 is created by threaded coupling of the coupling ring 36 onto the threaded portion 34 extending from the bumper 12. The bumper assembly insert 50 is separately connected to the base member 14 as will be described in greater detail in reference to FIGS. 11 through 13. The first ratchet device 24 is homogeneously connected to the coupling ring 36 by a first connection neck 52 such that the first ratchet device 24 is spaced above an end face 54 of the coupling ring 36. Similarly, the second ratchet device 26 is homogeneously connected to the coupling ring 36 by a second connection neck 56 which also positions the first ratchet device 24 spaced above the end face 54 of the coupling ring 36. Axial rotation of the first ratchet device 24 and the second ratchet device 26 occurs with respect to the first connection neck 52 and the second connection neck 56 that promotes elastic deflection of the connected one of the first ratchet device 24 or the second ratchet device 26 to allow ratcheting motion with the teeth as the ratchet portion 22 axially rotates.

Figure 6:
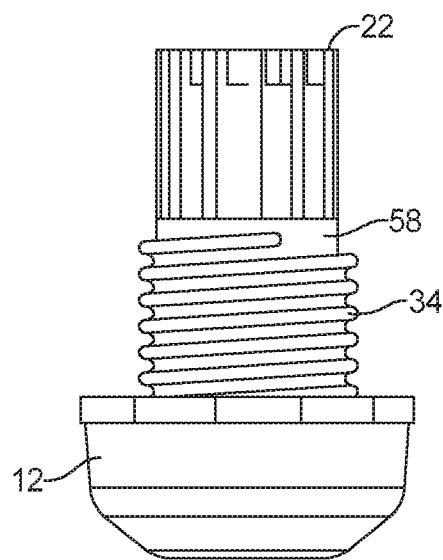
FIG. 6 is a side elevational view of a bumper portion of the bumper assembly insert of FIG. 5.

Referring to FIG. 6, the ratchet portion 22 is homogeneously connected to the bumper 12 by a shank portion 58. The threaded portion 34 is formed on the shank portion 58 during a molding operation or may be cut by a thread cutting tool.

Referring to FIG. 7 and again to FIGS. 1 through 6, in addition to the first ratchet tooth 42, the second ratchet device 26 of the coupling ring 36 includes a second ratchet tooth 60 created at an opposite end of the second ratchet device 26 from the first ratchet tooth 42. Similarly, the first ratchet device 24 of the coupling ring 36 includes a third ratchet tooth 62 at a first end and a fourth ratchet tooth 64 created at a second or opposite end. According to several aspects, either all of the ratchet teeth are simultaneously positioned in individual ones of the valleys of the ratchet portion 22, or all of the teeth are simultaneously outwardly deflected by contact with one of the splines. According to further aspects, when one of the teeth of each of the first ratchet device 24 and the second ratchet device 26 is positioned in one of the valleys of the ratchet portion 22, the other one of the teeth of the first ratchet device 24 and the second ratchet device 26 is in contact with one of the splines.

Figure 8:
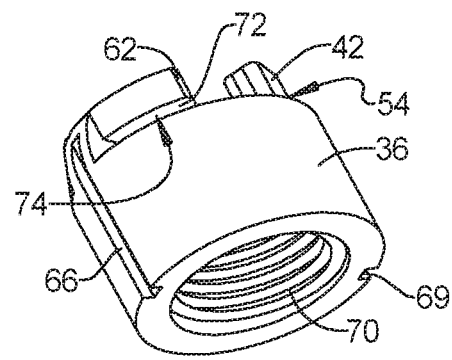
FIG. 8 is a bottom perspective view of the coupling nut of FIG. 7.

To prevent axial rotation of the coupling ring 36 while permitting axial rotation of the bumper 12, a first elongated slot 66 extends for an axial length in an outer face 68 of the coupling ring 36 which receives a key shown and described in reference to FIG. 8. The first elongated slot 66 may also extend into at least a portion of the first connection neck 52. As specifically shown with reference again to FIG. 5, to assemble the bumper assembly insert 50, the coupling ring 36 is releasably fastened to the bumper 12 using an internal thread 70 of the coupling ring 36 which engages the threaded portion 34 of the bumper 12.

Figure 7:
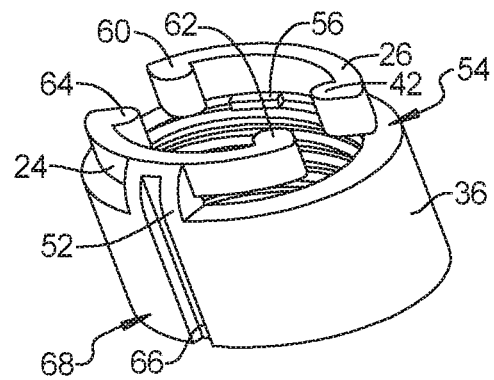
FIG. 7 is a top perspective view of a coupling nut of the bumper assembly insert of FIG. 5.

Referring to FIG. 8 and again to FIG. 7, as a further means of preventing axial rotation of the coupling ring 36 while permitting axial rotation and longitudinal displacement of the bumper 12, a second elongated slot 69 similar to the first elongated slot 66 extends for an axial length in the outer face 68 of the coupling ring 36 which receives a key shown and described in reference to FIG. 8. The second elongated slot 69 may also extend into at least a portion of the second connection neck 56.

Referring to FIG. 9 and again to FIGS. 1, 5, 7 and 8, the base member 14 provides a through passage 76 which receives the bumper assembly insert 50. As the coupling ring 36 is received in the through passage 76, a first key 78 and an oppositely directed second key 80 each formed on an inner wall 81 of the through passage 76 and extending partially into the through passage 76 are slidably received in one of the first elongated slot 66 and the second elongated slot 69. The first key 78 and the second key 80 define male members which when received in one of the first elongated slot 66 or the second elongated slot 69 allow the coupling ring 36 to slidably enter the through passage in a sliding direction 82 but by frictional contact with walls of the first elongated slot 66 and the second elongated slot 69 thereafter prevent axial rotation of the coupling ring 36. Each of the retention arms such as the first retention arm 28 include a contact face 84 created in a first hook-end 86. The coupling ring 36 is displaced in the sliding direction 82 until the end face 54 of the coupling ring 36 directly contacts the contact face 84 of each of the retention arms such as the first retention arm 28.

Referring to FIG. 10 and again to 9, in addition to the first retention arm 28, the base member 14 includes a second retention arm 88, a third retention arm 90 and a fourth retention arm 92 each homogenously extending from a second face 94 of the base member 14 which is oppositely directed with respect to the first face 40 of the base member 14. Similar to the first hook-end 86, the second retention arm 88 includes a second hook-end 96, the third retention arm 90 includes a third hook-end 98 and the fourth retention arm 92 includes a fourth hook-end 100. Each of the retention arms is positioned about the through passage 76 such that the first hook-end 86 is opposed to and faces the third hook-end 98, and the second hook-end 96 is opposed to and faces the fourth hook-end 100. Although four retention arms are depicted, according to further aspects, the base member 14 can also include only two opposed retention arms such as the first retention arm 28 and the third retention arm 90, or can include three retention arms oriented at 120 degree increments about the through passage 76.

Figure 9:
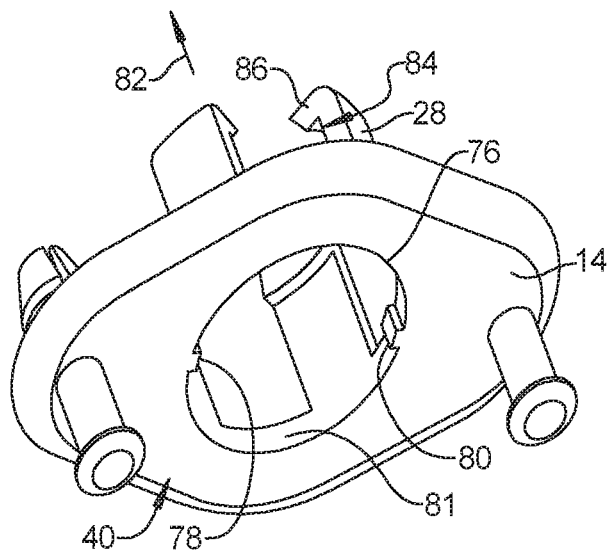
FIG. 9 is a top perspective view of a base member of the adjustable bumper assembly of FIG. 1.
Figure 10:
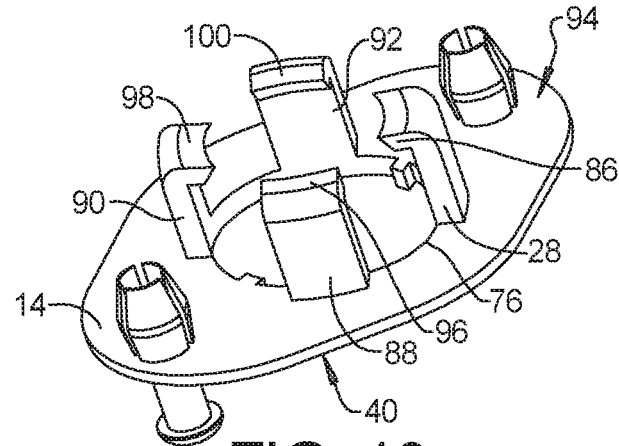
FIG. 10 is a bottom perspective view of the base member of FIG. 9.

Referring to FIG. 11 and again to FIGS. 1, 9 and 10, installation of the adjustable bumper assembly 10 into a vehicle 102, such as into a vehicle deck portion 104 is conducted in two stages. In a first stage, the base member 14 is installed by aligning all of the retention arms such as the second retention arm 88 shown with an aperture 106 created in the vehicle deck portion 104 and inserting the retention arms into the aperture 106 in an installation direction 108. The base member 14 is displaced until the second face 94 of the base member 14 directly contacts a planar mounting surface 110 surrounding the aperture 106. At this time the first fastener retention member 16 is received in a bore 112 created in the planar mounting surface 110 and the second fastener retention member 16' (not clearly visible in this view) is received in a bore 112'. The fastener 18 is then frictionally forced into the first fastener retention member 16 which outwardly expands to lock against a wall 114 of the bore 112, and the second fastener retention member 16' is similarly inserted into the second fastener retention member 16'. The base member 14 is thereby locked onto the vehicle deck portion 104.

Figure 11:
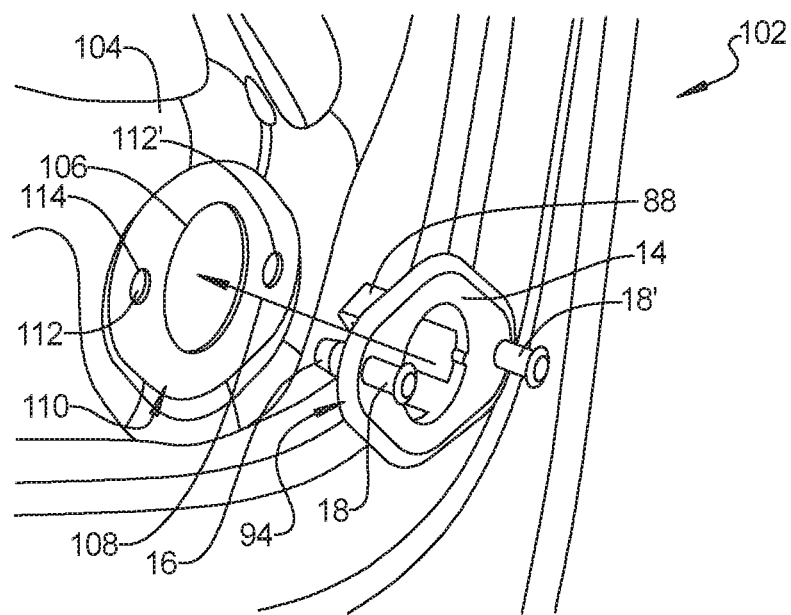
FIG. 11 is a top perspective view of a deck space of a vehicle during installation of the base member of FIG. 9.

Referring to FIG. 12 and again to FIG. 11, a trim member 116 which can include carpeting or a polymeric layer is placed over and substantially covers the vehicle deck portion 104. A clearance aperture 118 is provided at each location of one of the base members 14 such that the clearance aperture 118 is aligned with the through passage 76. Because the base member 14 is already in position, the clearance aperture 118 can be closely aligned with the through passage 76 and the subsequent installation of the bumper assembly insert 50 described in reference to FIG. 13 does not require substantial alignment to provide an aesthetically optimal presentation of the adjustable bumper assembly 10.

Figure 12:
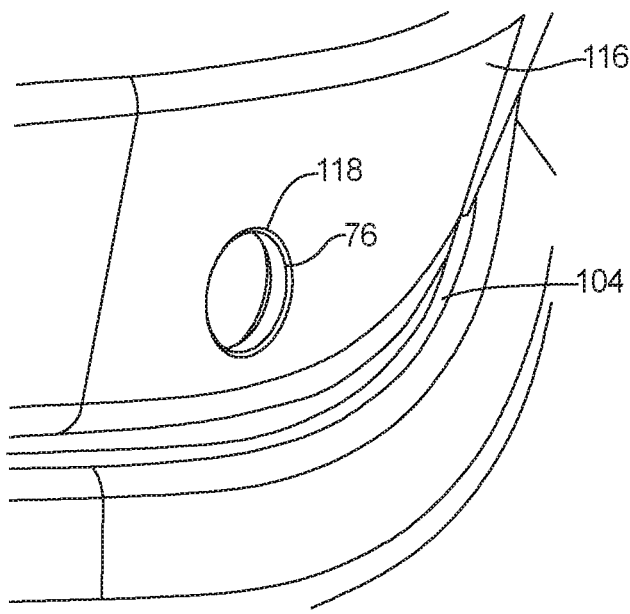
FIG. 12 is a top perspective view of the deck space of FIG. 11 after further installation of a trim component.
Figure 13:
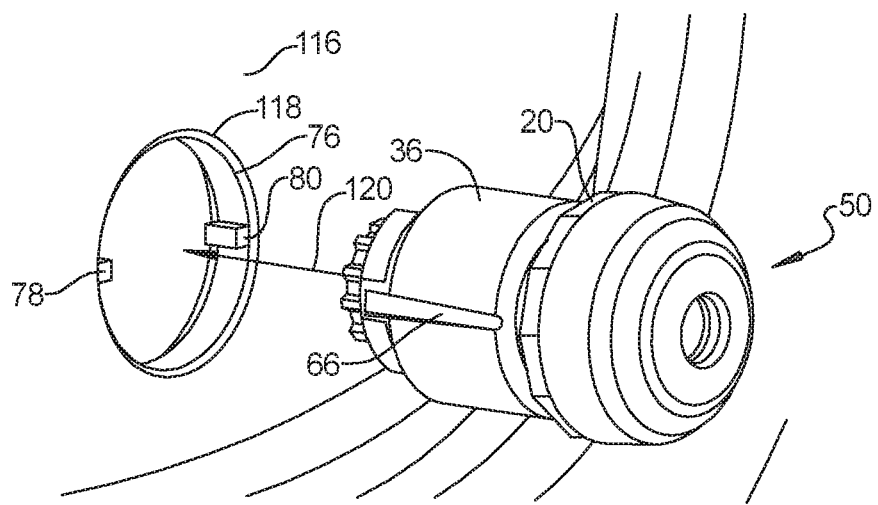
FIG. 13 is a top perspective view of the deck space of FIG. 12 during installation of the bumper assembly insert of FIG. 5.

Referring to FIG. 13 and again to FIGS. 11 through 12, in a second stage of installation of the adjustable bumper assembly 10, the bumper assembly insert 50 is inserted into the clearance aperture 118 and further into the through passage 76 of the base member 14 in an installation direction 120 with the keys such as the first key 78 and the oppositely directed second key 80 received in the elongated slots of the coupling ring 36 such as the first elongated slot 66.

Figure 14:
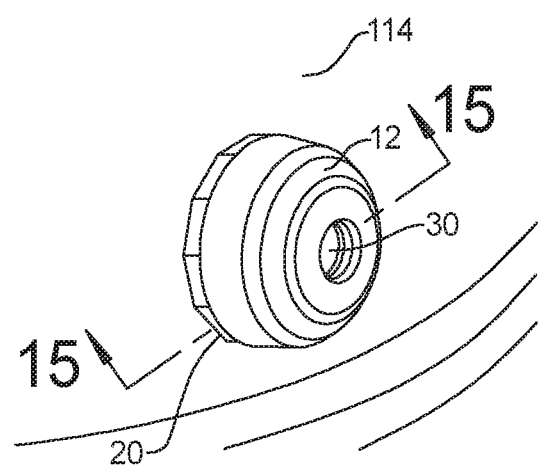
FIG. 14 is a top perspective view of the deck space of FIG. 12 following installation of the bumper assembly insert of FIG. 5.

Referring to FIG. 14 and again to FIGS. 1 through 13, a completed installation of an adjustable bumper assembly 10 allows the bumper 12 to be manually rotated by manual contact with the engagement ring 20 of the bumper 12 to adjust an inward or outward position of the bumper 12. Alternately, the fastener nut 32 can also be engaged by a tool such as a wrench (not shown) to promote axial rotation of the bumper 12. The ratcheting capability provided by the first ratchet device 24 and the second ratchet device 26 with the splines of the ratchet portion 22 help retain the selected position of the bumper 12.

A diameter of the bumper 12 is increased from known designs and the clearance aperture 118 of the trim member 116 is decreased compared to known bumper installations so that the bumper 12 will always cover the clearance aperture 118 in the trim member 116 with approximately 4 mm of overlap. This prevents the bumper 12 from retracting into the clearance aperture 118 in the trim member 116, forcing the bumper 12 to remain outside of the clearance aperture 118 in the trim member 116 at all times. Once the bumper assembly insert 50 is slid into place within the base member 14 the bumper 12 can be left in the preset state or adjusted based on build conditions of the vehicle. A total axial adjustment range of approximately 5.0 mm for the bumper 12 is provided.

The terms "homogeneous" and "homogeneously" as used herein are defined as a component or member formed of parts or elements that are all of a same material, and generally formed concurrently during a manufacturing process such as an injection molding process, such that ail of the features, portions and segments of the component or member have the same chemical and physical properties.

An adjustable bumper assembly 10 of the present disclosure offers several advantages. These include an increase of the bumper diameter and a decrease in the trim hole diameter so that the bumper will always cover the hole in the trim with approximately 4 mm of overlap. This prevents the bumper from retracting into the hole in the trim, forcing the bumper to remain outside of the trim at all times. The bumper assembly insert 50 having the adjustable portion defined by the coupling ring 36 is installed after the trim is applied and is non-rotatably engaged into place while allowing the bumper 12 to axially rotate. This creates a 2-piece design instead of the current 1-piece bumper design. Once snapped into place, the bumper can be left in the preset state or adjusted based on build conditions.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An adjustable bumper assembly, comprising:
   a first part defining a bumper assembly insert, the bumper assembly insert having a bumper displaceably connected to a coupling ring; and
   a second part defining a base member, the base member having multiple retention arms connected to the base member extending away from the base member and each having a hook-end,
   the coupling ring when slidably received in a through passage of the base member contacting the hook-end of the retention arms, the coupling ring being non-rotatably engaged to the base member such that axial rotation of the bumper axially extends or retracts the bumper with respect to the base member,
   wherein the bumper includes a bumper head and a threaded portion extending from the bumper head threadably receiving the coupling ring to displaceably connect the bumper to the coupling ring, and
   wherein the bumper includes a ratchet portion extending from the threaded portion having multiple splines interspaced by multiple valleys.

2. The adjustable bumper assembly of claim 1, wherein the coupling ring includes a ratchet device having a tooth releasably positioned in one of the multiple valleys or outwardly deflected by one of the splines as the bumper axially rotates with respect to the base member, the tooth when positioned in one of the multiple valleys acting as a releasable stop against axial rotation of the bumper.

3. The adjustable bumper assembly of claim 2, wherein the ratchet device is homogeneously connected to the coupling ring by a first connection neck that allows elastic deflection of the first ratchet device defining a ratcheting motion of the first ratchet device.

4. The adjustable bumper assembly of claim 2, wherein the ratchet device is homogeneously connected to the coupling ring by a connection neck such that the ratchet device is spaced away from an end face of the coupling ring.

5. The adjustable bumper assembly of claim 1, wherein the coupling ring includes at least one axial slot located on an outer surface of the coupling ring.

6. The adjustable bumper assembly of claim 5, wherein the base member includes at least one key extending partially into the through passage of the base member.

7. The adjustable bumper assembly of claim 6, wherein the at least one key is received in the at least one axial slot allowing the coupling ring to slidably displace toward the hook-end of the retention arms but preventing axial rotation of the coupling ring with respect to the base member.

8. The adjustable bumper assembly of claim 1, wherein the hook-end of the retention arms defines an axial stop for the coupling ring.

9. An adjustable bumper assembly, comprising:
  a bumper assembly insert including a bumper head, a threaded portion connected to the bumper head and a ratchet portion extending from the threaded portion;
  a coupling ring threadably connected to the threaded portion, the coupling ring having a ratchet device with a tooth biased into contact with the ratchet portion; and
  a base member having multiple retention arms homogeneously connected to the base member extending away from a face of the base member;
  the coupling ring when slidably received in a through passage created in the face of the base member contacting the retention arms, the coupling ring being non-rotatably engaged to the base member such that axial rotation of the bumper assembly insert with respect to the coupling ring axially extends or retracts the bumper assembly insert with respect to the base member.

10. The adjustable bumper assembly of claim 9, wherein the ratchet portion includes multiple splines interspaced by multiple valleys, the tooth of the ratchet device ratcheting over successive ones of the splines and into successive ones of the multiple valleys during axial rotation of the bumper assembly insert, the tooth when positioned in one of the multiple valleys acting as a releasable stop resisting axial rotation of the bumper.

11. The adjustable bumper assembly of claim 10, wherein the ratchet device is homogeneously connected to the coupling ring by a connection neck that allows elastic deflection of the ratchet device defining a ratcheting motion of the ratchet device during axial rotation of the bumper assembly insert.

12. The adjustable bumper assembly of claim 11, wherein the ratchet device is spaced away from an end face of the coupling ring by the connection neck.

13. The adjustable bumper assembly of claim 9, wherein the multiple retention arms each have a hook-end, the coupling ring contacting the hook-end of the retention arms defining an installed position of the coupling ring.

14. The adjustable bumper assembly of claim 9, wherein:
  the coupling ring includes an axial slot located on an outer surface of the coupling ring; and
  the base member includes a key extending partially into the through passage of the base member, the key when received in the axial slot preventing axial rotation of the coupling ring.

15. The adjustable bumper assembly of claim 14, wherein:
  the multiple retention arms each have a hook-end, the contact ring when contacting the hook-end of the retention arms defining an installed position of the coupling ring; and
  the key when received in the axial slot allows the coupling ring to slidably displace toward the hook-end of the retention arms.

16. A method for installing a bumper assembly into a vehicle, the bumper assembly including a bumper head, a threaded portion connected to the bumper head and a ratchet portion extending from the threaded portion, the method comprising:
  connecting a base member having multiple retention arms homogeneously connected to the base member to a vehicle panel;
  covering the base member and the vehicle panel with a trim member having an aperture located at the base member;
  threadably connecting a coupling ring to the threaded portion;
  slidably extending the bumper assembly through the aperture of the trim member and into a through passage in a face of the base member until the bumper assembly contacts the retention arms; and
  non-rotatably engaging the coupling ring to the base member such that axial rotation of the bumper assembly with respect to the coupling ring axially extends or retracts the bumper assembly with respect to the base member.

17. The method of claim 16, further including biasing a tooth of a ratchet device extending from the coupling ring into contact with one of multiple successive valleys of the ratchet portion such that engagement of the tooth into any one of the valleys acts as a releasable stop resisting the axial rotation of the bumper assembly.

18. The method of claim 16, wherein the non-rotatably engaging step includes:
  creating an axial slot on an outer surface of the coupling ring; and
  aligning a key extending partially into the through passage of the base member into the axial slot to prevent axial rotation of the coupling ring during the axial rotation of the bumper assembly.

* * * * *